United States Patent
Boyer et al.

(10) Patent No.: US 12,311,781 B2
(45) Date of Patent: May 27, 2025

(54) THERMAL RUNAWAY DETECTION OF AUTOMOTIVE TRACTION BATTERIES EMPLOYING FORCE-SENSING RESISTOR (FSR) PRESSURE SENSOR

(71) Applicant: IEE INTERNATIONAL ELECTRONICS & ENGINEERING S.A., Echternach (LU)

(72) Inventors: Philippe Boyer, Boust (FR); Arthur Cretin, Luxembourg (LU); Patrick Di Mario Cola, Serrouville (FR); Thierry Goniva, Luxembourg (LU); Martin Thinnes, Trierweiler (DE); Lukas Wurth, Arlon (BE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 250 days.

(21) Appl. No.: 17/624,557

(22) PCT Filed: Jun. 3, 2020

(86) PCT No.: PCT/EP2020/065341
§ 371 (c)(1),
(2) Date: Jan. 3, 2022

(87) PCT Pub. No.: WO2021/001108
PCT Pub. Date: Jan. 7, 2021

(65) Prior Publication Data
US 2022/0242248 A1    Aug. 4, 2022

(30) Foreign Application Priority Data
Jul. 3, 2019 (LU) ........................ 101296

(51) Int. Cl.
*B60L 3/00* (2019.01)
*G01L 1/22* (2006.01)
(Continued)

(52) U.S. Cl.
CPC .......... *B60L 3/0046* (2013.01); *G01L 1/2287* (2013.01); *H01M 10/48* (2013.01);
(Continued)

(58) Field of Classification Search
CPC ... B60L 3/0046; H01M 50/30; H01M 50/204; H01M 10/48; H01M 10/482; H01M 2200/20; G01L 1/2287
See application file for complete search history.

(56) References Cited

U.S. PATENT DOCUMENTS 3,520,184 A     7/1970   Tanner et al.
5,641,903 A *   6/1997   Shinotuka .............. G01C 19/58
                                                                               73/504.06
(Continued)

FOREIGN PATENT DOCUMENTS

CN        104303358 A    1/2015
DE   102017211047 A1   1/2019
(Continued)

OTHER PUBLICATIONS

International Search Report corresponding to International Application No. PCT/EP2020/065341, dated Sep. 1, 2020, 3 pages.
(Continued)

*Primary Examiner* — Andrew J Cromer
(74) *Attorney, Agent, or Firm* — Reising Ethington P.C.

(57) ABSTRACT

A detection device for detecting a thermal runaway condition in a rechargeable automotive traction battery that includes a closed traction battery housing for receiving at least a plurality of rechargeable electrochemical energy cells. The detection device includes a force-sensing resistor.
(Continued)

The force-sensing resistor has flexible substrates separated by a spacer member and a vent outlet. The vent outlet is fluidically connectable to an exterior space of the traction battery housing if the force-sensing resistor is located inside the traction battery housing. At least one of the flexible substrates is operatively connectable to an interior space of the traction battery housing if the force-sensing resistor is located outside the traction battery housing.

15 Claims, 3 Drawing Sheets

(51) Int. Cl.
  *H01M 10/48* (2006.01)
  *H01M 50/204* (2021.01)
  *H01M 50/30* (2021.01)
(52) U.S. Cl.
  CPC ....... *H01M 10/482* (2013.01); *H01M 50/204* (2021.01); *H01M 50/30* (2021.01); *H01M 2200/20* (2013.01); *H01M 2220/20* (2013.01)

(56) References Cited

U.S. PATENT DOCUMENTS

| | | | |
|---|---|---|---|
| 9,806,310 B1 * | 10/2017 | Pounds | ............... H01M 10/613 |
| 2013/0328392 A1 | 12/2013 | Desbois-Renaudin | |
| 2017/0331157 A1 | 11/2017 | Newman et al. | |
| 2018/0079316 A1 * | 3/2018 | De Lira | ................... B60L 58/16 |
| 2019/0003906 A1 * | 1/2019 | Dervish | ............... A61B 5/1038 |
| 2020/0168959 A1 | 5/2020 | Hettrich | |
| 2021/0098840 A1 | 4/2021 | Kesper | |

FOREIGN PATENT DOCUMENTS

| | | |
|---|---|---|
| WO | 2018185074 A1 | 10/2018 |
| WO | 2019017994 A1 | 1/2019 |

OTHER PUBLICATIONS

Written Opinion corresponding to International Application No. PCT/EP2020/065341, dated Sep. 1, 2020, 7 bages.

Koch, S., Birke, K.P., Kuhn, R., Fast Thermal Runaway Detection for Lithium-Ion Cells in Large Scale Traction Batteries—Electrical Energy Storage Systems, Institute for Photovoltaics, University of Stuttgart, Germany, published Mar. 27, 2018, 11 pages.

English translation of Chinese Office Action corresponding to application 202080048946.9, dated Mar. 21, 2024, 9 pages.

* cited by examiner sectional view A-A

THERMAL RUNAWAY DETECTION OF AUTOMOTIVE TRACTION BATTERIES EMPLOYING FORCE-SENSING RESISTOR (FSR) PRESSURE SENSOR

TECHNICAL FIELD

The invention relates to a detection device for detecting a thermal runaway condition in a rechargeable automotive traction battery and a closed automotive traction battery housing including such detection device.

BACKGROUND

In the field of motor vehicle technology, motor vehicles are known which comprise a drive that includes an electric drive train with an electric motor that can be operated by means of an electric current generated by an electrical energy source. The electrical energy source can be designed as an electrochemical energy storage device, for example as at least one rechargeable battery, often somewhat inaccurately referred to as a traction battery.

Such automotive vehicles may be designed as a battery electric vehicle (BEV) that exclusively employs an electric motor for propulsion, a hybrid electric vehicle (HEV) comprising an internal combustion engine and an electric propulsion system, or a plug-in hybrid vehicle (PHEV) including an internal combustion engine and a traction battery that can be recharged by connecting a plug to the power grid. A common feature of these automotive vehicles is a rechargeable traction battery having a (ampere-hour) capacity that allows for an acceptable range of the vehicle.

Due to the amount of energy that can be stored in the rechargeable battery, there are increased security requirements in order to prevent the amount of energy stored from being released suddenly. Therefore, it is essential to be able to detect whether a thermal runaway started inside the battery pack before any smoke or fire reaches inside a vehicle compartment.

Thermal runaway is known to be one of the most serious failure modes of a rechargeable traction battery. Details are, for instance, described in Koch, Sascha et al. "Fast Thermal Runaway Detection for Lithium-Ion Cells in Large Scale Traction Batteries." (*Batteries* 2018, 4(2), 16; DOI:10.3390/batteries 4020016): Thermal runaway of single cells within a large scale lithium-ion battery is a well-known risk that can lead to critical situations if no counter measures are taken in today's lithium-ion traction batteries for battery electric vehicles (BEVs), plug-in hybrid electric vehicles (PHEV) and hybrid electric vehicles (HEVs). The United Nations have published a draft global technical regulation on electric vehicle safety (GTR EVS) describing a safety feature to warn passengers in case of a thermal runaway. Fast and reliable detection of faulty cells undergoing thermal runaway within the lithium-ion battery is therefore a key factor in battery designs for comprehensive passenger safety.

A set of various possible sensors has been chosen based on the determined cell thermal runaway impact. These sensors have been tested in different sized battery setups and compared with respect to their ability of fast and reliable thermal runaway detection and their feasibility for traction batteries. The selected sensors are a voltage sensor, a gas sensor, a smoke detector, a creep distance sensor, which is sensitive to a pollution of pads arranged on its surface, a temperature sensor, a pressure sensor, placed on the battery cells, and measuring absolute pressure in the range of 2 kPa $p_{sens} \leq 304$ kPa for determining the rise of internal battery pressure due to gas generation of a single cell, and a single point thin film piezo-resistive force sensor with the range of $0 \: N \leq F_{sens} \leq 445 \: N$ that is used to measure the force between a cell in thermal runaway and adjacent parts/cells caused by the cell swelling.

SUMMARY

It is therefore an object of the invention to provide a detection device of low complexity that is capable of detecting a thermal runaway condition in a rechargeable traction battery of an automotive vehicle preferably in an early stage, for instance before an outbreak of fire or smoke is noticeable inside the vehicle.

In one aspect of the present invention, the object is achieved by a detection device for detecting a thermal runaway condition in a rechargeable automotive traction battery. The automotive traction battery comprises a closed traction battery housing for receiving at least a plurality of rechargeable electrochemical energy cells. The detection device includes a force-sensing resistor that comprises at least two flexible substrates being separated by a spacer member and defining a force-sensitive area, and a venting duct connecting a space between the two substrates and a vent outlet of the force-sensing resistor. The vent outlet is fluidically connectable to an exterior of the traction battery housing if the force-sensing resistor is located inside the traction battery housing. At least one of the flexible substrates is operatively connectable to an interior space of the traction battery housing if the force-sensing resistor is located outside the traction battery housing.

The term "automotive", as used in this patent application, shall particularly be understood as being suitable for use in vehicles including passenger cars, trucks, semi-trailer trucks and buses. The term "closed traction battery housing", as used in this patent application, shall particularly be understood as a housing whose fluidic leakage to an exterior space of the housing is sufficiently low to allow for an increase in pressure in the interior space of the housing for a gas generation rate that is to be expected in a thermal runaway condition. The term "operatively connected", as used in this patent application, shall particularly be understood to mean that operatively connected objects are connected to one another in such a way that a force can be transmitted between the objects. The transmission of force can take place both by direct contact and indirectly, by at least one intermediate element.

In a typical FSR, as intended in this application, a paste-like sensing film may be sandwiched between two electrically conducting electrodes, which are covered by polymer films. An electric resistance between the electrodes can drop sharply when a predetermined force is applied to the sensing film. This change or drop in resistance may be detected and/or measured by a control circuit or resistance detection circuit operatively coupled to the FSR sensor. The control circuit or resistance detection circuit operatively coupled to the FSR sensor may preferably arranged outside of the battery housing and coupled to the FSR sensor by appropriate connection lines.

As the requirements with regard to precision and signal drift are low, an employment of the FSR in the proposed detection device allows to provide a detection device of low complexity for detecting a thermal runaway condition in a rechargeable automotive traction battery in an early stage. Moreover, signals from FSRs can be evaluated using relatively simple electronics, which can keep the hardware effort at a low level.

In preferred embodiments, the detection device further comprises a fluidic connecting member having two ends. If the force-sensing resistor is located inside the traction battery housing, one of the ends is fluidically connected to the vent outlet, and the other one of the ends is configured to fluidically connect the vent outlet to the exterior space of the traction battery housing. If the force-sensing resistor is located outside the traction battery housing, one of the ends of the fluidic connecting member is fluidically connected to the interior space of the traction battery housing, and the other one of the ends is either fluidically connected to one of the flexible substrates or to a chamber with a flexible wall that is adjacently arranged to one of the flexible substrates. The phrases "configured for" and "configured to", as used in this application, shall in particular be understood as being specifically laid out, furnished or arranged. By using the fluidic connecting member, the FSR can be located and fulfill its intended function properly in a variety of positions depending on a specific application.

Preferably, the venting duct is defined by the spacer member. By using the spacer member in a double function the design of the FSR can be kept simple.

In preferred embodiments of the detection device, one of the flexible substrates of the force-sensing resistor is configured to be arrangeable in contact with a part of an inner wall of the traction battery housing. In this way, the inner wall of the traction battery housing can be used as an abutment to support the FSR and to create a defined and directed effect of an increase in pressure inside the traction battery housing on the FSR in case of a thermal runaway condition.

Preferably, the detection device further comprises a pressure-equalizing vent that is arranged within a fluidic path between the venting duct and the exterior space of the traction battery housing. The pressure-equalizing vent can keep the space between the two substrates of the FSR at a current atmospheric pressure and can prevent false positives, which might otherwise potentially be created by a change of the atmospheric pressure such as can occur during an ascent to high altitude or by a rapid change in temperature.

In another aspect of the invention, a closed automotive traction battery housing defining an interior space that is configured for receiving at least a plurality of rechargeable electrochemical energy cells is provided. The traction battery housing comprises an embodiment of the detection device as disclosed herein. The vent outlet is fluidically connected to an exterior of the traction battery housing if the force-sensing resistor is located inside the traction battery housing. At least one of the flexible substrates is operatively connected to an interior space of the traction battery housing if the force-sensing resistor is located outside the traction battery housing.

The benefits described in context with the detection device apply to the proposed automotive traction battery housing to the full extent.

In preferred embodiments of the automotive traction battery housing, the fluidic connecting member comprises a tube, which is fixedly connected to the traction battery housing in a sealed manner. In this way, depending on the specific application, the FSR can be positioned inside or outside the traction battery housing, which can provide for large design freedom.

Preferably, the automotive traction battery housing further includes a through-hole and a plug member that is adapted to the through-hole and that is configured for being attached to the traction battery housing to cover the through-hole in a sealing manner. The plug member defines a cavity, which comprises an opening that, in an installed state, is facing towards the interior space of the traction battery housing, and which further comprises a flat surface at a top side of the cavity. One of the flexible substrates of the force-sensing resistor is in mechanical contact with the flat surface. The plug member projects from the traction battery housing to the exterior space so as to allow the fluidic connecting member that is designed as a through-hole in a lateral surface of the plug member to establish a fluid connection between the vent outlet and an exterior space of the traction battery housing.

This embodiment of the detection device can enable a design, which is especially compact, robust and service-friendly.

Preferably, the traction battery housing through-hole is equipped with a thread, and the plug member is cylinder-shaped with an outer thread that corresponds to the thread of the through-hole. By that, easy access to the FSR can be provided to allow for improved serviceability which may be required by the manufacturer.

In preferred embodiments of the automotive traction battery housing that include a through-hole and a plug member as described before, a sensitive area of the force-sensing resistor has a circular shape that is adapted to a dimension of the flat surface of the plug member. In this way, an optimum sensitivity for detecting a thermal runaway condition for given dimensions of the plug member, which meet existing space constraints, can be accomplished.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

In the different figures, the same parts are always provided with the same reference symbols or numerals, respectively. Thus, they are usually only described once.

DETAILED DESCRIPTION

Figure 1:
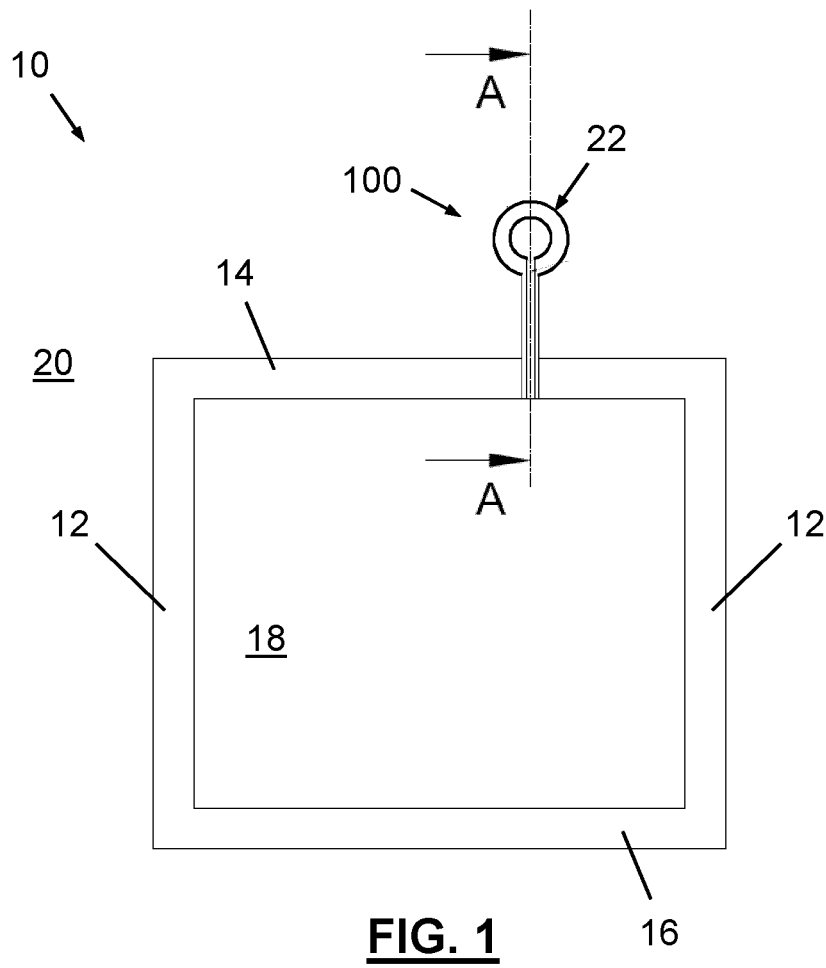
FIG. 1 schematically illustrates a closed automotive traction battery housing with an embodiment of the detection device in accordance with the invention in an installed state in a sectional front view.

FIG. 1 schematically illustrates a closed automotive traction battery housing 10 with a possible embodiment of the detection device in accordance with the invention in an installed state in a sectional front view.

The traction battery housing 10 defines an interior space 18 that is configured for receiving a plurality of rechargeable electrochemical energy cells not shown in FIG. 1. The electrochemical energy cells may form a lithium-ion battery (accumulator). The traction battery housing 10 is closed in the sense that a fluidic leakage of the traction battery housing 10 to an exterior space 20 is sufficiently low to allow for an increase in pressure in the interior space 18 of the traction battery housing 10 at a gas generation rate that is to be expected in a thermal runaway condition of at least one of the electrochemical energy cells.

The traction battery housing 10 may be made, at least to a major part, from metal sheet, e.g. aluminum injected side walls, from fiber reinforced plastic, for instance glass fiber reinforced plastic, or from a combination of those materials. The traction battery housing 10 comprises side walls 12, a cover plate 14 and a base plate 16.

Figure 3:
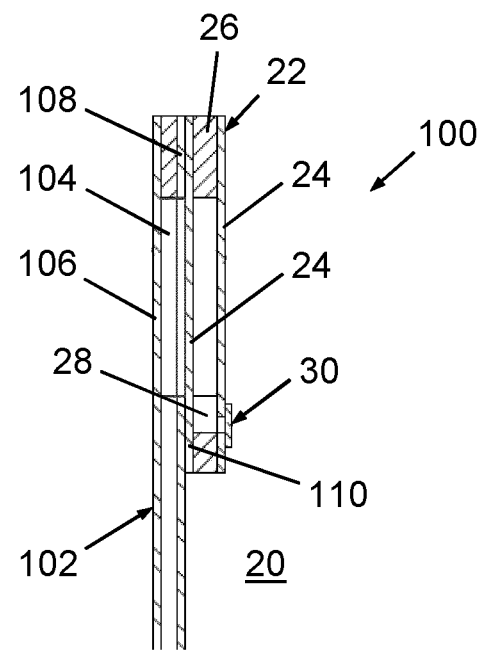
FIG. 3 is a schematic detailed view of the detection device pursuant to FIG. 2, FIG. 4 schematically illustrates the closed automotive traction battery housing pursuant to FIG. 1 with an alternative embodiment of the detection device in accordance with the invention in an installed state in a sectional front view.

The traction battery housing 10 is equipped with a detection device 100 for detecting a thermal runaway condition in the rechargeable automotive traction battery. The detection device 100 includes a force-sensing resistor (FSR) 22 that is located outside the traction battery housing 10. The FSR 22 may comprise two flexible substrates 24, which are separated by a spacer member 26 and define a force-sensitive area (FIG. 3). This assembly may enclose a layer of conductive ink. The FSR 22 may include two sets of electrically conductive lines that are electrically insulated from each other and are attached to at least one of the two flexible substrates 24. When a force is applied to the FSR 22, the layer of conductive ink establishes electrically conductive paths between the two sets of electrically conductive lines, resulting in a decrease of the electric resistance. This change or decrease in resistance may be detected and/or measured by a control circuit or resistance detection circuit operatively coupled to the FSR sensor.

The FSR 22 further comprises a venting duct, which is defined by the spacer member 26. The venting duct connects a space between the two flexible substrates 24 and a vent outlet 28 of the FSR 22.

The flexible substrates 24 may be made from a plastic material that is selected from a group of plastic materials including, but not being limited to, polyester (PE), polyethylene terephthalate (PET), polyimide (PI), polyetherimide (PEI), polyethylene naphthalate (PEN) and combinations of at least two of these plastic materials.

Suitable FSRs are commercially available in a large number of variations, covering a large range of applications.

Figure 2:
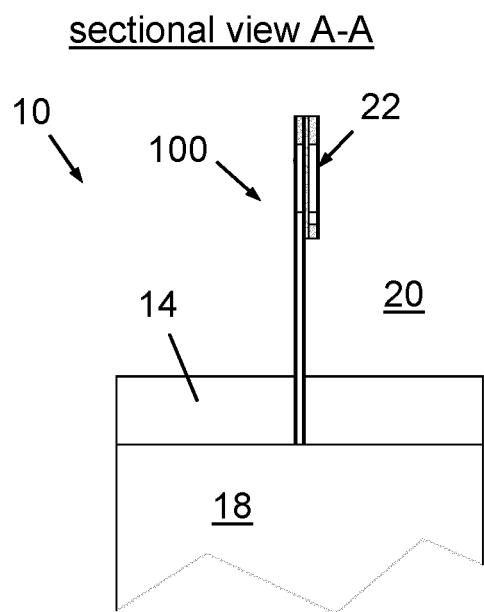
FIG. 2 shows a schematic detailed sectional side view of the detection device pursuant to FIG. 1.

FIG. 2 shows a schematic detailed sectional side view of the detection device 100 pursuant to FIG. 1. The detection device 100 further includes a fluidic connecting member 102. The fluidic connecting member 102 comprises a straight tube having two ends. The fluidic connecting member 102 is fixedly connected to the cover plate 14 of the traction battery housing 10 in a sealed manner, for instance by a welding connection or by a compression fitting, and protrudes, in the installed state shown in FIG. 2, in an upward direction. The lower arranged one of the ends is fluidically connected to the interior space 18 of the traction battery housing 10. The upper arranged one of the ends is fluidically connected to a flat circular chamber 104 of the fluidic connecting member 102 (FIG. 3) whose diameter is adapted to the force-sensitive area of the FSR 22. The chamber 104 has a rear wall 106 and a front wall 108 that is facing the FSR 22. A center portion of the front wall 108 may be designed as a circular through-hole. The through-hole may be open, as shown in FIG. 3, or it may be covered by a flexible membrane attached to the front wall 108 in a sealing manner. The flexible membrane may be made from a plastic material similar to the plastic material of the flexible substrates 24 of the FSR 22. The FSR 22 is fixedly attached to an outer rim portion 110 of annular shape of the front wall 108 in a sealing manner, for instance by applying an adhesive. If the through-hole is designed to be open, one of the flexible substrates 24 is fluidically connected to the interior space 18 of the traction battery housing 10 in a direct way. If the through-hole is covered by a flexible membrane, the flexible membrane is adjacently arranged to one of the flexible substrates 24 of the FSR 22. In any case, one of the flexible substrates 24 of the FSR 22 is operatively connected to the interior space 18 of the traction battery housing 10.

In the event of a thermal runaway condition in the automotive traction battery, the gas pressure rises in the interior space 18 of the traction battery housing 10. This increase in pressure is transferred to the FSR 22 by the fluidic connecting member 102 and the chamber 104, either directly or by deflection of the flexible membrane, and can be assessed by monitoring the status of the electrical resistance of the FSR 22 by means of the control circuit or resistance detection circuit operatively coupled to the FSR sensor.

The detection device 100 further comprises a pressure-equalizing vent 30 that is arranged within a fluidic path between the venting duct and the exterior space 20 of the traction battery housing 10. The pressure-equalizing vent 30 provides equal pressure conditions between the venting duct and the exterior space 20 of the traction battery housing 10 with regard to long-term changes in the atmospheric pressure to prevent false positives, but is, however, unable to compensate the fast increase in pressure generated by a thermal runaway condition.

It is pointed out herewith that the figures in this application cannot be regarded as drawings to scale. In particular, a ratio of longitudinal to transverse dimensions was chosen for reasons of illustration and does not have to correspond to the actual conditions.

In FIGS. 4 to 8, alternative possible embodiments of the detection device in accordance with the invention are schematically illustrated. In order to avoid unnecessary repetition, only differences between the various embodiments will be described in the following. For features in any of these figures that are not described, reference is made to the description of the first embodiment.

Figure 4:
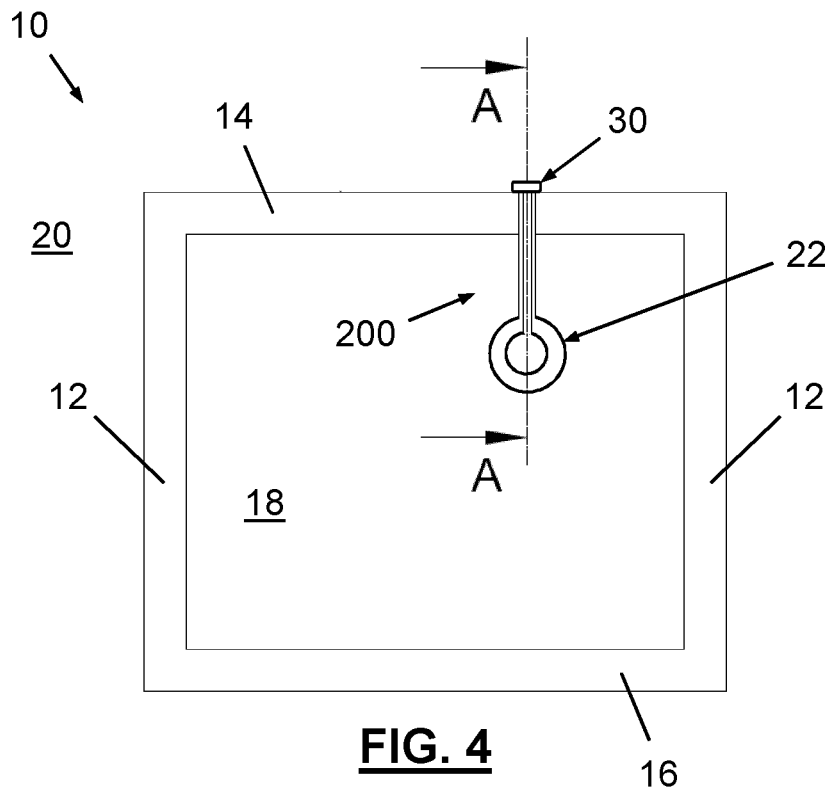

FIG. 4 schematically illustrates the closed automotive traction battery housing 10 pursuant to FIG. 1 with an alternative embodiment of the detection device 200 in accordance with the invention in an installed state in a sectional front view.

The detection device 200 includes an FSR 22 that is located inside the traction battery housing 10. The FSR 22 is designed similar to the FSR 22 of the first embodiment of the detection device 100.

Figure 5:
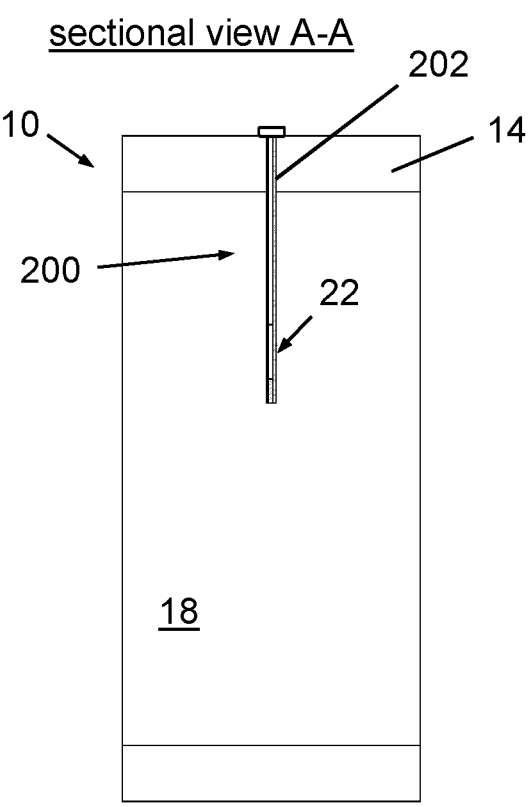
FIG. 5 shows a schematic detailed sectional side view of the detection device pursuant to FIG. 4.
Figure 6:
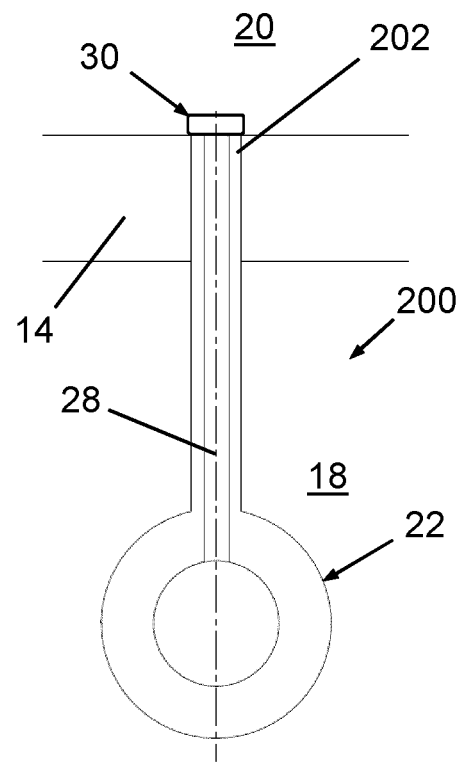
FIG. 6 is a schematic detailed view of the detection device pursuant to FIG. 5, FIG. 7 schematically illustrates an alternative embodiment of a closed automotive traction battery housing with another alternative embodiment of the detection device in accordance with the invention in an installed state in a sectional front view.

FIG. 5 shows a schematic detailed sectional side view of the detection device 200 pursuant to FIG. 4. The detection device 200 further comprises a fluidic connecting member 202. The fluidic connecting member 202 is designed as a straight tube having two ends. The fluidic connecting member 202 is fixedly connected to the cover plate 14 of the traction battery housing 10 in a sealed manner, for instance by a welding connection or by a compression fitting, and protrudes, in the installed state shown in FIG. 5, in a downward direction. The lower arranged one of the ends is fluidically connected to the vent outlet 28 of the FSR 22 (FIG. 6). The upper arranged one of the ends fluidically connects the vent outlet 28 to the exterior space 20 of the traction battery housing 10.

In the event of a thermal runaway condition in the automotive traction battery, the gas pressure rises in the interior space 18 of the traction battery housing 10. This increase in pressure is exerted directly on the force-sensitive area of the FSR 22 against the atmospheric pressure which is present in the exterior space 20 and which is provided to the space between the two flexible substrates 24 of the FSR 22 by the fluidic connecting member 202. The increase in pressure can be assessed by monitoring the status of the electrical resistance of the FSR 22.

Figure 7:
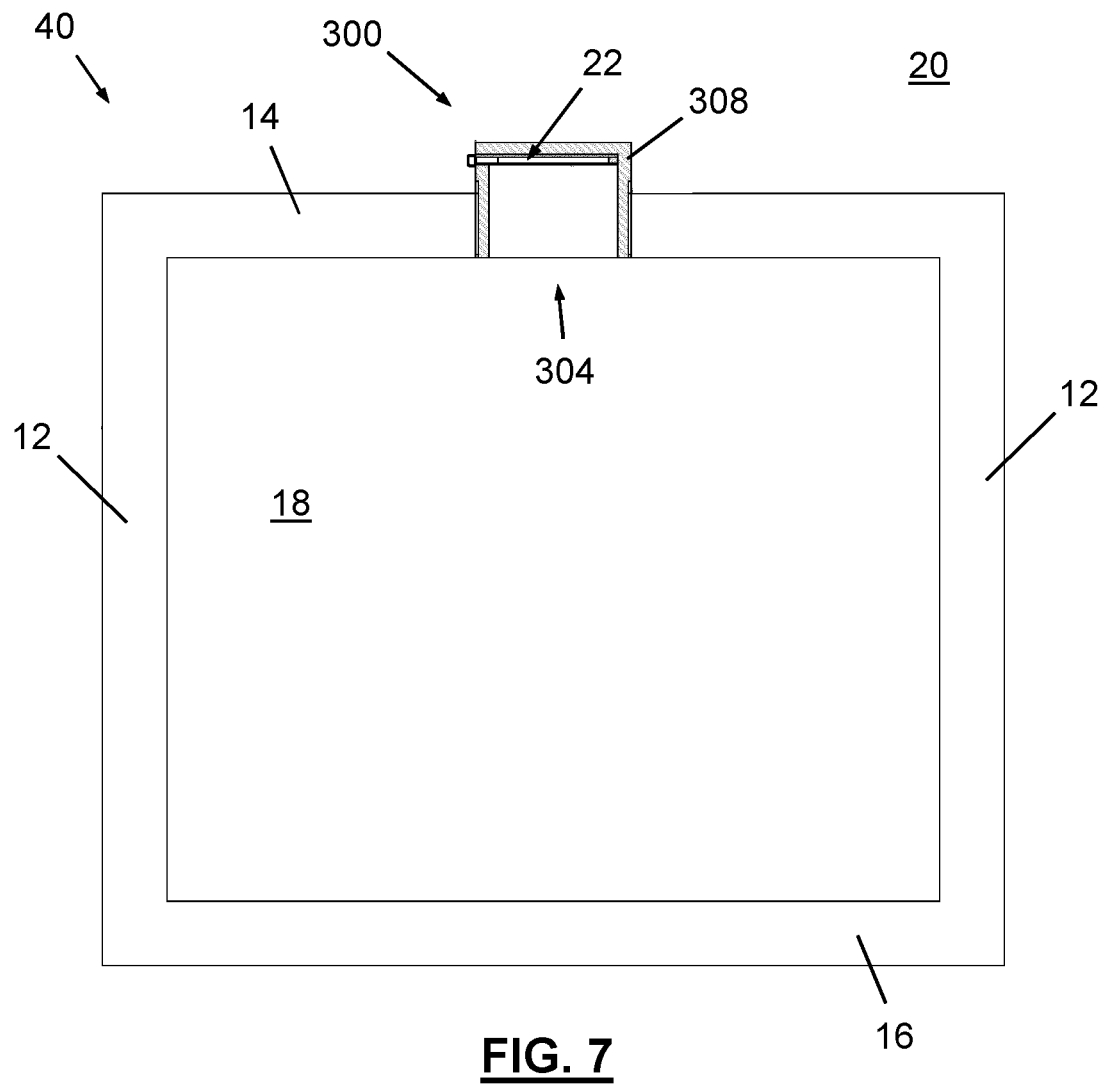

FIG. 7 schematically illustrates an alternative embodiment of a closed automotive traction battery housing 40 comprising another alternative embodiment of the detection device 300 in accordance with the invention in an installed state in a sectional front view.

Figure 8:
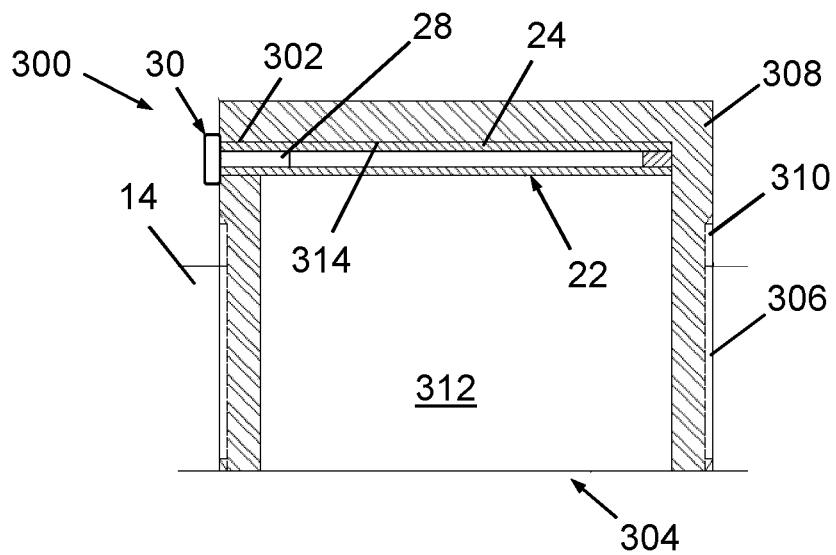
FIG. 8 is a schematic detailed view of the detection device pursuant to FIG. 7.

In contrast to the earlier embodiment, the automotive traction battery housing 40 pursuant to FIG. 7 further includes another through-hole 304 in the cover plate 14 and a plug member 308. The through-hole 304 has a circular shape and is equipped with a thread 306 (FIG. 8). The plug member 308 is of cylindrical shape and is furnished with an outer thread 310 that corresponds to the thread 306 of the through-hole 304. The plug member 308 is adapted to the through-hole 304 and is configured for being attached to the traction battery housing 40 so as to cover the through-hole 304 in a sealing manner, which for instance may be accomplished by use of thread sealant or sealing tape.

The plug member 308 defines a cavity 312 comprising an opening that, in the installed state shown in FIGS. 7 and 8, is facing towards the interior space 18 of the traction battery housing 40, and further comprising a flat surface 314 at a top side of the cavity 312.

The detection device 300 includes an FSR 22 with a sensitive area of preferably circular shape. A dimension of the flat surface 314 of the plug member 308, and, more specifically, a diameter of the flat surface 314, and the sensitive area of the FSR 22 are adapted to each other.

In the installed state shown in FIG. 8, which is a schematic detailed view of the detection device 300 pursuant to FIG. 7, one of the flexible substrates 24 of the FSR 22 is in mechanical contact with the flat surface 314, which serves as an abutment and support to the FSR 22.

As the cavity 312 forms part of the interior space 18, the flat surface 314 of the plug member 308 can be considered a part of an inner wall of the traction battery housing 40. In this sense, one of the flexible substrates 24 of the FSR 22 is arranged in contact with a part of the inner wall of the traction battery housing 40.

The detection device 300 further comprises a fluidic connecting member 302 with two ends that is designed as a through-hole in a lateral surface of the plug member 308. In the installed state, the plug member 308 projects from the traction battery housing 40 into the exterior space 20 so as to allow the through-hole in the lateral surface to establish a fluid connection between the vent outlet 28 of the FSR 22 and the exterior space 20 of the traction battery housing 40.

In the event of a thermal runaway condition in the automotive traction battery, the gas pressure rises in the interior space 18 of the traction battery housing 40. This increase in pressure is exerted directly on the flexible substrate 24 of the FSR 22 which is not in mechanical contact with the flat surface 314 against the atmospheric pressure which is present in the exterior space 20 and which is provided to the space between the two flexible substrates 24 by the through-hole in the lateral surface of the plug member 308. The increase in pressure can be assessed by monitoring the status of the electrical resistance of the FSR 22.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A rechargeable automotive traction battery comprising a closed traction battery housing for receiving at least a plurality of rechargeable electrochemical energy cells in an interior space and a detection device for detecting a thermal runaway condition in the rechargeable automotive traction battery, the detection device including a force-sensing resistor located inside the traction battery housing, the force-sensing resistor comprising:
   first and second substrates being separated by a spacer member and defining a space between the first and second substrates, the first substrate being flexible and operatively connected to the interior space of the closed traction battery housing,
   first and second electrically conductive lines being attached to the first and second substrates, respectively, and
   a venting duct connecting the space between the first and second substrates and a vent outlet of the force-sensing resistor,
   wherein the force-sensing resistor is configured such that a rise in gas pressure in the interior space of the closed traction battery housing causes the first flexible substrate to deflect towards the second substrate, the deflection of the first flexible substrate towards the second substrate causes a change in resistance between the first and second electrically conductive lines, and the change in resistance between the first and second electrically conductive lines can be used to detect a thermal runaway condition in the rechargeable automotive traction battery, and
   wherein the vent outlet of the force-sensing resistor is fluidically connected to an exterior space of the traction battery housing.

2. The rechargeable automotive traction battery as claimed in claim 1, further comprising a fluidic connecting member having two ends, wherein, one of the ends is fluidically connected to the vent outlet of the force-sensing resistor, and the other one of the ends is configured to fluidically connect the vent outlet to the exterior space of the traction battery housing.

3. The rechargeable automotive traction battery as claimed in claim 2, wherein the fluidic connecting member comprises a tube, which is fixedly connected to the traction battery housing in a sealed manner.

4. The rechargeable automotive traction battery as claimed in claim 3, wherein a sensitive area of the force-sensing resistor has a circular shape that is adapted to a dimension of the flat surface of the plug member.

5. The rechargeable automotive traction battery as claimed in claim 1, wherein the venting duct is defined by the spacer member.

6. The rechargeable automotive traction battery as claimed in claim 1, wherein one of the first and second substrates of the force-sensing resistor is arranged in contact with a part of an inner wall of the traction battery housing.

7. The rechargeable automotive traction battery as claimed in claim 1, further comprising a pressure-equalizing vent that is arranged within a fluidic path between the venting duct and the exterior space of the traction battery housing.

8. The rechargeable automotive traction battery as claimed in claim 1, wherein the closed automotive traction battery housing further includes a through-hole and a plug member that is adapted to the through-hole and that is configured for being attached to the traction battery housing to cover the through-hole in a sealing manner, wherein
the plug member defines a cavity comprising an opening that, in an installed state, is facing towards the interior space of the traction battery housing, and further comprising a flat surface at a top side of the cavity,
one of the first and second substrates of the force-sensing resistor is in mechanical contact with the flat surface, and
the plug member projects from the traction battery housing into the exterior space so as to allow the fluidic connecting member that is designed as a through-hole in a lateral surface of the plug member to establish a fluid connection between the vent outlet and the exterior space of the traction battery housing.

9. The rechargeable automotive traction battery as claimed in claim 8, wherein the traction battery housing through-hole is equipped with a thread, and the plug member is cylinder-shaped with an outer thread that corresponds to the thread of the through-hole.

10. A rechargeable automotive traction battery comprising a closed traction battery housing for receiving at least a plurality of rechargeable electrochemical energy cells in an interior space and a detection device for detecting a thermal runaway condition in the rechargeable automotive traction battery, the detection device including a force-sensing resistor that comprises:
first and second substrates being separated by a spacer member and defining a space between the first and second substrates, the first substrate being flexible and operatively connected to the interior space of the closed traction battery housing,
first and second electrically conductive lines being attached to the first and second substrates, respectively, and
a venting duct connecting the space between the first and second substrates and a vent outlet of the force-sensing resistor,
wherein the force-sensing resistor is configured such that a rise in gas pressure in the interior space of the closed traction battery housing causes the first flexible substrate to deflect towards the second substrate, the deflection of the first flexible substrate towards the second substrate causes a change in resistance between the first and second electrically conductive lines, and the change in resistance between the first and second electrically conductive lines can be used to detect a thermal runaway condition in the rechargeable automotive traction battery, and
wherein the force-sensing resistor is located outside of the traction battery housing.

11. The rechargeable automotive traction battery as claimed in claim 10, further comprising a fluidic connecting member having two ends, wherein one of the ends is fluidically connected to the interior space of the traction battery housing, and the other one of the ends is either fluidically connected to one of the first and second substrates or to a chamber with a flexible wall that is adjacently arranged to one of the first and second substrates.

12. The rechargeable automotive traction battery as claimed in claim 11, wherein the fluidic connecting member comprises a tube, which is fixedly connected to the traction battery housing in a sealed manner.

13. The rechargeable automotive traction battery as claimed in claim 10, wherein the venting duct is defined by the spacer member.

14. The rechargeable automotive traction battery as claimed in claim 10, further comprising a pressure-equalizing vent that is arranged within a fluidic path between the venting duct and the exterior space of the traction battery housing.

15. A detection device for detecting a thermal runaway condition in a rechargeable automotive traction battery, the rechargeable automotive traction battery has a closed traction battery housing for receiving a plurality of rechargeable electrochemical energy cells in an interior space, the detection device has a force-sensing resistor comprising:
first and second substrates being separated by a spacer member and defining a space between the first and second substrates, the first substrate being flexible and operatively connected to the interior space of the closed traction battery housing;
first and second electrically conductive lines being attached to the first and second substrates, respectively; and
a venting duct connecting the space between the first and second substrates and a vent outlet of the force-sensing resistor, the vent outlet is fluidically connected to an exterior space of the traction battery housing,
wherein the force-sensing resistor is configured such that a rise in gas pressure in the interior space of the closed traction battery housing causes the first flexible substrate to deflect towards the second substrate, the deflection of the first flexible substrate towards the second substrate causes a change in resistance between the first and second electrically conductive lines, and the change in resistance between the first and second electrically conductive lines can be used to detect a thermal runaway condition in the rechargeable automotive traction battery.

* * * * *